United States Patent [19]

Hiromori

[11] Patent Number: 5,134,692
[45] Date of Patent: Jul. 28, 1992

[54] COMBINED ELECTRONIC CALCULATOR AND ABACUS WITH DEFLECTIVE GUIDE BARS

[75] Inventor: Junji Hiromori, Tokyo, Japan
[73] Assignee: Hiromori Inc., Tokyo, Japan
[21] Appl. No.: 355,770
[22] Filed: May 23, 1989
[51] Int. Cl.$^5$ .............. G06F 3/02; G06F 3/147; G06F 15/02; G06F 15/16
[52] U.S. Cl. ................. 395/275; 364/234; 364/234.4; 364/237.5; 364/237.9; 364/231.2; 364/231.1; 364/231.31; 364/226.2; 364/DIG. 2; 364/709.13
[58] Field of Search ... 364/200 MS File, 900 MS File, 364/709.02–709.13; 434/203; 395/275, 700

[56] References Cited

U.S. PATENT DOCUMENTS

| | | | |
|---|---|---|---|
| 3,092,917 | 6/1963 | Podell | 434/203 |
| 3,688,418 | 9/1972 | Wilson | 434/203 |
| 3,731,401 | 5/1973 | Kojima | 434/203 |
| 3,963,906 | 6/1976 | Yamamura et al. | 364/709.13 |
| 4,217,656 | 8/1980 | Hirano et al. | 364/710 |
| 4,812,124 | 3/1984 | Colodner et al. | 434/203 |

FOREIGN PATENT DOCUMENTS

| | | |
|---|---|---|
| 58-132847 | 11/1983 | Japan . |
| 59-38868 | 6/1984 | Japan . |
| 59-153252 | 1/1985 | Japan . |
| 60-68453 | 8/1985 | Japan . |
| 63-273923 | 11/1988 | Japan . |

*Primary Examiner*—Thomas C. Lee
*Assistant Examiner*—Daniel H. Pan
*Attorney, Agent, or Firm*—Dilworth & Barrese

[57] ABSTRACT

An electronic calculator is provided with an abacus and has both advantages of the calculator and abacus. An abacus and a portable electronic calculator are integrally constituted in such a manner as superimposing each other. Thus, the calculator according to the present invention can be used as a abacus by shifting a counter of an abacus along a guide bar thereof and it can also be used as a conventional electronic calculator by pushing the counter downward.

18 Claims, 2 Drawing Sheets

COMBINED ELECTRONIC CALCULATOR AND ABACUS WITH DEFLECTIVE GUIDE BARS

BACKGROUND OF THE INVENTION

The present invention relates to a small sized portable electronic calculator provided with an abacus. Hitherto, various kinds of portable electronic calculators were know which were capable of carrying out the simple four rules of arithmetic calculation and also complicated numerical calculation. Furthermore, a large sized electronic calculator put onto a desk and a card typed thin electronic calculator have been on the market. A commercial battery, a dry battery or a solar battery have respectively been utilized for said calculator.

Before the small sized portable electronic calculator had become prevalent, an abacus was widely used as a calculator. Even today there are those who use the abacus for easy operation of addition and subtraction calculation in order to obtain the results more quickly than with the electronic calculator.

Presently, when the small sized electronic calculator because widely used, said calculator and the abacus were separately used as a convenient calculator depending upon the case and time. However, it may be noted that a calculating means which can utilize both advantages of said calculator and abacus simultaneously would be an advantageous improvement thereover.

SUMMARY OF THE INVENTION

With the above in mind, it is an object of the present invention to provide a calculator having both advantages of an electronic calculator and an abacus which have each been widely used.

The aforementioned object can be attained by providing a small sized portable electronic calculator comprising; a small sized electronic calculator provided with a registration key, various keys necessary for calculation, an operating circuit and an indicator, an abacus frame firmly fixed to or integrally formed with a casing of said calculator, a plurality of deflective guide bars fixed to said abacus frame, a plurality of counters of the abacus slidably held by means of said guide bar and at least some of said counters being constituted as an operating member to push said registration key and said various keys.

By integrally constituting the abacus and small sized portable electronic calculator in a manner such that said calculator and abacus are superimposed upon one another as they stand, a small sized portable electronic calculator provided with an abacus according to the present invention can be used as an abacus by shifting counters thereof along a guide bar of said counters. On the other hand, it can also be used as an electronic calculator by pushing the counters down against the calculator.

DETAILED DESCRIPTION OF THE PREFERRED EMBODIMENT :

Hereinafter, embodiments according to the present invention will be described in detail with reference to the drawings.

Figure 1:
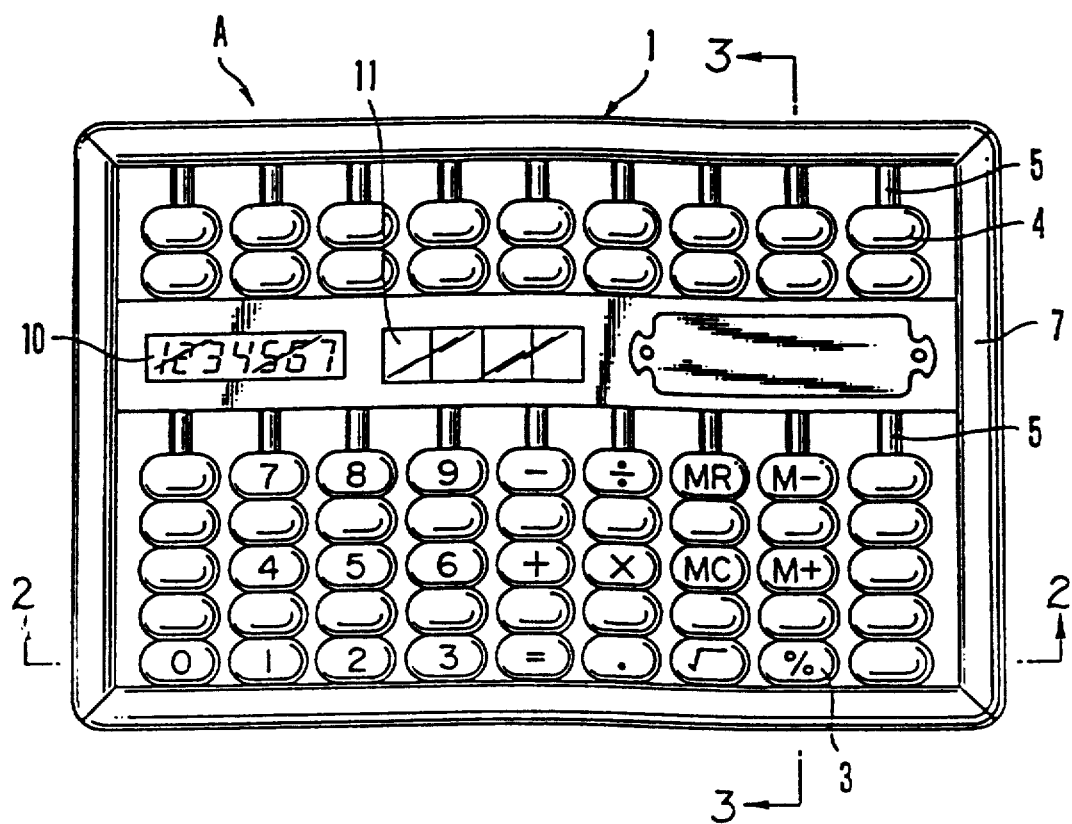
FIG. 1 is a plan view of a portable electronic calculator provided with an abacus according to the present invention.
Figure 2:
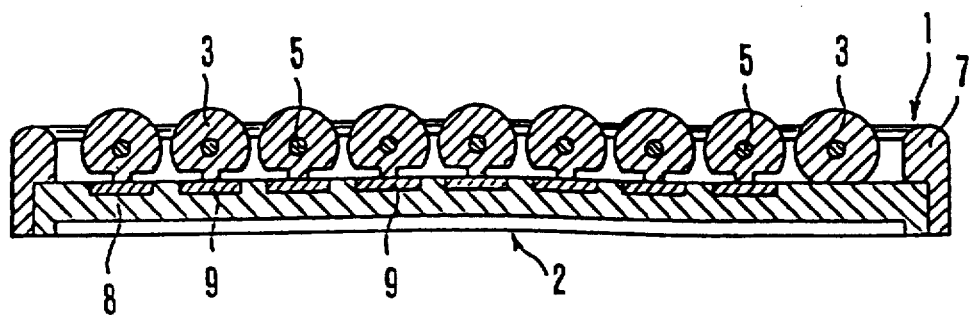
FIG. 2 is a sectional view taken along line B—B in FIG. 1.

In FIG. 1 to FIG. 2, reference character (A) denotes a small sized portable electronic calculator according to the present invention constituting a novel calculator by integrally superimposing an abacus(1) and a portable electronic calculator(2) (hereinafter referred to as "an electronic calculator").

Said abacus(1) is composed of a counter(3) for evaluating numerical value one and another counter(4) for evaluating numerical value five, a guide bar(5) for slidably holding said counters and a reed bar(7) as a boundary between said counters(3,4). The embodiment illustrated in the figures is a Chinese style abacus providing with five pieces of the counter(3) and two pieces of the counter(4) at each reed. However, as in the case of a Japanese style abacus, one piece of the counter(4) and four or four pieces of the counter(3) may also be employed.

Regarding the configuration of said counters(3,4), they may naturally be formed in the shape of a wheel having a curved surface at the peripherical surface thereof and may also be formed in the shape superimposing each base of two cones.

Figure 3:
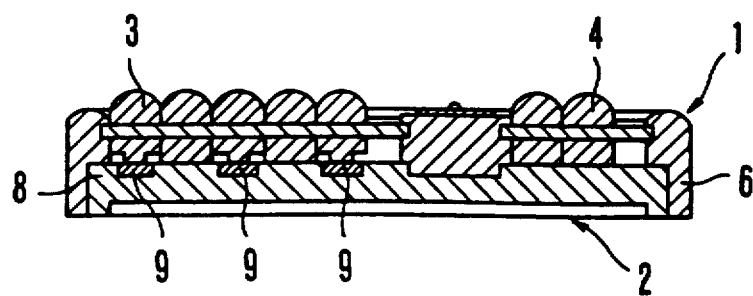
FIG. 3 is a sectional view taken along line C—C in FIG. 1.

On an upper surface of a casing of an electronic calculator(2), a registration key of "0"-"9" and the other various keys necessary for operation such as "+","−","×","÷","=","√","%" etc are also disposed depending upon an object of calculation. Among said keys, a key for switching ON or OFF, or a key for clearing numerical value etc necessary for actuating the portable electronic calculator as a usual electronic calculator is indicated. In FIG. 3, a switch(9) is illustrated.

An indicator (10) for indicating numerical values by means of the registration key is disposed at a suitable position e.g. onto the reed bar(7).

Said indicator (10) is constituted as that of a conventional electronic calculator by employing liquid crystals etc.

Regarding power source, commercial the power source may be employed and a solar battery(11) is mounted at a suitable position according to the embodiment illustrated in FIG. 1.

Within a casing(8) of the electronic calculator(2), an operation circuit substrate constituted by means of IC circuit etc of a conventional portable electronic calculator is mounted.

By shifting the counters(3,4) along the guide bar(5), the electronic calculator according to the present invention can be used as an abacus. On the other hand, when the counter(3) or (4) corresponding to each registration key of the electronic calculator(2) is pushed in a non-use state of the abacus, said key is switched on by said counter due to deflection of the guide bar(5). Thus, it becomes possible to actuate said calculator for carrying out the necessary calculation as a conventional calculator. The indicator(10) indicates numerical values having been inputted for calculation or the one obtained by carrying out the calculation.

It is naturally possible to dispose each counter of an abacus to correspond to the key of the electronic calculator(2). It is further possible to arrange some of the counters as extraneous to the actuation of said key. It is also possible to alternately select a counter for actuating the key under consideration of the operation of said counter.

The counter of an abacus can perform pressing down action satisfactorily, but it is preferable to indicate numerical values or marks on the counter corresponding to that indicated on to the electronic calculator(2) for the expedition of a key operation, e.g. "0","1","2" etc and "=","×","=" etc. Said numerical values or marks may be indicated on the surface of the counter so as to easily view. However, it sometimes occurs that the numerical values or marks can not easily be viewed when the counter is rotated. In order to prevent the above inconvenience, each portion contacting the electronic calculator(2) is formed to have a notch portion so that the rotation of said counter may be prevented due to contacting of the surface of said notch portion and the surface of the electronic calculator (2).

Figure 4:
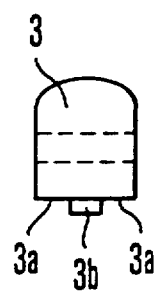
FIG. 4 is a front view of a counter of a Chinese style abacus.
Figure 5:
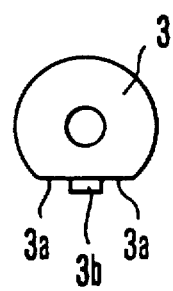
FIG. 5 is a side view of said counter of FIG. 4.

Regarding a Chinese style counter(3) in the shape of a wheel illustrated in FIG. 1, as shown in FIGS. 4 and 5 a notch portion(3a) in the shape of a plane is formed at the portion corresponding to the surface of said calculator(2) and an operating projection(3b) projecting from the surface of said notch portion is further arranged. Onto an upper surface of the counter of an abacus opposite to said notch portion(3a), numerical values or marks corresponding to that indicated on various keys of the calculator(2) are indicated as illustrated in FIG. 1. The rotation of the counter(3) of an abacus can be prevented due to the contact of said portion(3a) with a casing or surface of the calculator(2) and the key can be actuated by means of the operating projection(3b) by pushing the counter(3) downwards.

The counters of the portable electronic calculator of the present invention may comprise a notch portion 15 in the shape of a plane formed at a portion of the counter 3' having the configuration of two superimposed bases of two cones, the notch portion 15 contacting a surface of the calculator to thereby prevent rotation of the respective counter 3' due to contact of the notch portion 15' with the surface of the calculator. A portion opposite to the notch portion 15 is formed in the shape of a plane which is suitable for being pressed with a finger. Numerical values or marks corresponding to the respective key of the calculator are indicated on either this plane or on a conical surface immediately adjacent thereto.

Figure 6:
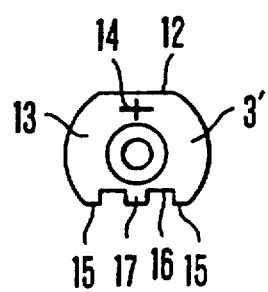
FIG. 6 is a side view of a counter of a Japanese style abacus.
Figure 7:
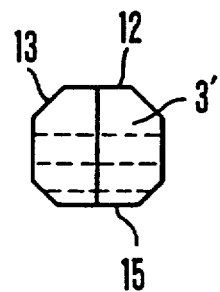
FIG. 7 is a front view of said counter FIG. 6.

Regarding a counter having a superimposed configuration of each base of two cones, the peripherical surface thereof is sharp and causes pain when pushed repeatedly. Therefore, as illustrated in FIG. 6 and FIG. 7, it is preferable to form a flat portion(12) suitably for pushing the same downwards with the finger at the portion of a counter (3') corresponding to the surface of the counter(2) and also an opposite portion thereof. Onto said flat portion(12) or conical surface(13), numerical values or marks (14) corresponding to that of the key of the calculator(2) e.g. "=","−" etc are indicated. A notch portion (15) in the shape of a plane is formed at a portion corresponding to the surface of the calculator(2), thereby preventing the rotation of the counter(3') due to the contact of said notch portion(15) with the casing of said calculator.

It is possible to operate the key by pushing the counter(3') downwards when the notch portion(15) can contact the key. As illustrated in FIG. 6, a recess(16) is further formed at said notch portion(15) so as to form an operating projection(17) at the middle portion of said recess(16) so that said operating portion only can contact the key. Thus, the operation of said key becomes certain. By forming said operating projection(17) somewhat projectively from a notch surface of said notch portion, the operating projection (17) only can contact the key. On the other hand said notch portion(15) contacts a housing surface of the calculator (2) so as to prevent the rotation of the counter(3'). Since the key of the calculator(2) is actuated by means of the counter shifting up and down due to the deflection of the guide bar(5), a counter adjacent to the counter pushed downwards with the finger may somewhat be shifted. Depending upon a shifting amount, two keys are simultaneously pushed downwards and as a result operational error may sometimes occur. In order to prevent said operational error, an alternate counter can be utilized for key operation with respect to one piece of the guide bar and the other counters are disposed at a position away from the key. Regarding the disposition of the key, it can be determined under consideration of the operation of a counter.

As described above, according to the present invention a calculator having both functions of an abacus and a small sized portable electronic calculator can be obtained. It becomes possible to use the calculator as an abacus or an electronic calculator as occasion demands. When the numerical value obtained by means of the calculator is confirmed, it becomes possible to check it with the numerical value obtained by means of an abacus while detaining the former value at the indication(10),thereby improving the operation of calculation.

What is claimed is:

1. A portable electronic calculator device provided with an abacus, comprising:
   a compact electronic calculator provided with at least one registration key, calculation keys, a circuit for operating said electronic calculator, and an indicator;
   an abacus frame firmly fixed to or integrally formed with a casing of said calculator;
   a plurality of deflective guide bars fixed to said abacus frame; and
   a plurality of counters of said abacus slidably retained upon said guide bars and being structured and positioned as operating members to contact said registration and calculation keys when shifted or pressed in a direction towards said keys.

2. The device of claim 1, wherein
   a notch portion in the shape of a plane is formed at a portion of each said counter/operating member having a configuration of superimposed bases of two cones, said notch portion arranged to contact a surface of the calculator whereby rotation of said counter/operating member is prevented,
   a portion of each said counter/operating member opposite sad notch portion being formed in the shape of a plane to be suitable for being pressed by a finger, and
   numerical values or calculation marks corresponding to the respective keys of said calculator being indicated either on said planar surface or a conical surface adjacent thereto.

3. The device of claim 2, wherein said notch portion comprises a recess shaped and positioned to define an operating projection such that said operating projection is arranged to contact one of the keys of said calculator when shifted or pressed in a direction towards said one of said keys.

4. The device of claim 3, wherein said operating projection is formed at a middle of said recess such that only said operating projection can contact the respective key of said calculator when said respective counter/operating member is shifted or pressed in a direction towards the respective key.

5. The device of claim 1, wherein said operating circuit comprises a substrate, with said counters/operating members being mounted to contact said substrate upon being pressed, and thereby activate said circuit.

6. The device of claim 5, wherein said substrate comprises switches corresponding to said respective keys, and said counter/operating members are arranged to contact said respective switches upon being shifted or pressed in a direction towards said respective switches.

7. The device of claim 5, additionally comprising a solar battery mounted upon said substrate.

8. The device of claim 12, wherein said indicator and a battery are mounted upon said substrate to define a boundary between at least two of said abacus counters.

9. The device of claim 5, wherein said guide bars are each mounted to be deflected upon pressing of each said respective counter/operating member slidably mounted thereon, whereby an operating projection situated upon said counter/operating member contacts said respective indicator key on said substrate.

10. The device of claim 9, wherein said counter/operating members are spaced away from each other on said abacus guide bars to avoid inadvertent operation of two keys at once.

11. The device of claim 1, additionally comprising a reed bar defining a boundary between at least two of said counters.

12. The device of claim 11, wherein said indicator and a battery for operating said circuit of said calculator are mounted upon said reed bar.

13. The device of claim 1, wherein
- a peripheral surface of each counter/operating member is formed in the shape of a wheel as a Chinese type abacus;
- a notch portion is formed in each said counter/operating member in the shape of a plane and having an operating projection at a position facing said calculator;
- rotation of each said counter/operating member being prevented due to contact of said respective notch portion with a surface of said calculator;
- each said operating projection being disposed to contact one of said keys of said calculator when shifted or pressed in a direction towards said one of said keys; and
- numerical values or calculation marks corresponding to the respective keys of said calculator being indicated on upper surfaces of said counter/operating members.

14. The device of claim 1, wherein said deflective guide bars are mounted upon said abacus frame which is in turn mounted upon said calculator casing such that said abacus is superimposed over said calculator.

15. The device of claim 1, wherein said abacus counters are arranged in the form of a Japanese or Chinese style abacus.

16. The device of claim 1, wherein said respective keys, counters/operating members and guide bars are structured and arranged such that a key is witched on by a respective counter due to deflection of a guide bar upon which said respective counter is mounted.

17. The device of claim 1, additionally comprising counters structured and arranged solely as counters for said abacus.

18. The device of claim 1, wherein said abacus and calculator are structured and arranged to be operable completely independently from one another.

* * * * *